United States Patent
Tommy et al.

(10) Patent No.: US 11,462,229 B2
(45) Date of Patent: Oct. 4, 2022

(54) SYSTEM AND METHOD FOR REDUCING NOISE COMPONENTS IN A LIVE AUDIO STREAM

(71) Applicant: Tata Consultancy Services Limited, Mumbai (IN)

(72) Inventors: Robin Tommy, Thiruvananthapuram (IN); Reshmi Ravindranathan, Thiruvananthapuram (IN); Navin Infant Raj, Thiruvananthapuram (IN); Venkatakrishna Akula, Thiruvananthapuram (IN); Jithin Laiju Ravi, Thiruvananthapuram (IN); Anita Nanadikar, Thiruvananthapuram (IN); Anil Kumar Sharma, Thiruvananthapuram (IN); Pranav Champaklal Shah, Thiruvananthapuram (IN); Bhasha Prasad Khose, Thiruvananthapuram (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 316 days.

(21) Appl. No.: 16/811,633

(22) Filed: Mar. 6, 2020

(65) Prior Publication Data
US 2021/0118462 A1     Apr. 22, 2021

(30) Foreign Application Priority Data
Oct. 17, 2019 (IN) .............................. 201921042203

(51) Int. Cl.
| G10L 21/0232 | (2013.01) |
| G06N 20/00 | (2019.01) |
| G06K 9/00 | (2022.01) |
| G06N 3/08 | (2006.01) |
| G10L 15/16 | (2006.01) |

(52) U.S. Cl.
CPC ........ *G10L 21/0232* (2013.01); *G06K 9/0051* (2013.01); *G06K 9/00536* (2013.01);
(Continued)

(58) Field of Classification Search
USPC ......................................................... 704/200
See application file for complete search history.

(56) References Cited

U.S. PATENT DOCUMENTS

| 5,185,848 A * | 2/1993 | Aritsuka | ................. G10L 15/16 |
| | | | 704/202 |
| 5,280,289 A * | 1/1994 | Root | ................... G01S 13/5244 |
| | | | 342/91 |

(Continued)

FOREIGN PATENT DOCUMENTS

| CN | 1741168 A * | 3/2006 | ............. G11B 20/10 |
| CN | 102684195 A * | 9/2012 | ............. Y02E 40/22 |
| CN | WO 2019014890 A1 * | 1/2019 | ......... G10L 21/0232 |

*Primary Examiner* — Shaun Roberts
(74) *Attorney, Agent, or Firm* — Finnegan, Henderson, Farabow, Garrett & Dunner LLP

(57) ABSTRACT

This disclosure relates generally to a system and method to identify a plurality of noises or their combination to suppress them and enhancing the deteriorated input signal in a dynamic manner. It identifies noises in the audio signal and categorizing them based on the trained database of noises. A combination of deep neural network (DNN) and artificial Intelligence (AI) helps the system for self-learning to understand and capture noises in the environment and retain the model to reduce noises from the next attempt. The system suppresses unwanted noise coming from the external environment with the help of AI based algorithms, by understanding, differentiating, and enhancing human voice in a live environment. The system will help in the reduction of unwanted noises and enhance the experience of business and public meetings, video conferences, musical events, speech
(Continued)

broadcasts etc. that could cause distractions, disturbances and create barriers in the conversation.

12 Claims, 3 Drawing Sheets

(52) U.S. Cl.
CPC ............... *G06N 3/08* (2013.01); *G06N 20/00* (2019.01); *G10L 15/16* (2013.01)

(56) References Cited

U.S. PATENT DOCUMENTS

| | | | |
|---|---|---|---|
| 5,335,312 A * | 8/1994 | Mekata | G10L 21/0208 |
| | | | 704/226 |
| 6,453,285 B1 | 9/2002 | Anderson et al. | |
| 6,453,289 B1 | 9/2002 | Ertem et al. | |
| 10,522,167 B1 * | 12/2019 | Ayrapetian | G10L 17/18 |
| 10,897,675 B1 * | 1/2021 | Tsitovich | G06N 3/08 |
| 2001/0016020 A1 | 8/2001 | Gustafsson et al. | |
| 2003/0179888 A1 | 9/2003 | Burnett et al. | |
| 2016/0138967 A1 * | 5/2016 | Schuhmacher | G06F 30/15 |
| | | | 73/645 |
| 2017/0221479 A1 * | 8/2017 | Latorre-Martinez | G10L 15/07 |
| 2018/0137877 A1 * | 5/2018 | Du | H04R 3/00 |
| 2018/0286425 A1 * | 10/2018 | Baek | G10L 21/0232 |
| 2019/0043516 A1 | 2/2019 | Germain et al. | |
| 2020/0090676 A1 * | 3/2020 | Nandi | G10L 21/0264 |
| 2020/0184991 A1 * | 6/2020 | Cleve | H04S 7/40 |
| 2020/0211580 A1 * | 7/2020 | Lee | G10L 21/0216 |
| 2021/0065731 A1 * | 3/2021 | Matsukawa | G10K 11/17873 |

* cited by examiner

SYSTEM AND METHOD FOR REDUCING NOISE COMPONENTS IN A LIVE AUDIO STREAM

CROSS-REFERENCE TO RELATED APPLICATIONS AND PRIORITY

This U.S. patent application claims priority under 35 U.S.C. § 119 to India Application No. 201921042203, filed on Oct. 17, 2019. The entire contents of the abovementioned application are incorporated herein by reference.

TECHNICAL FIELD

The disclosure herein generally relates to a field of real time noise reduction in an audio signal, more particularly, a system and method for identifying a plurality of noises or their combination to suppress them and enhancing the deteriorated input signal in a dynamic manner.

BACKGROUND

To make any kind of communication or conversation effective, it is primal to have a noise-free environment. In fact, noises can be considered as a disruption in the normal conversational flow. Currently, most of the important conversations happen in meeting rooms, conference calls with people joining from noisy places, people calling centers etc. It is important to have high conversation quality for an uninterrupted and effective communications. One of the major issues is the noise disturbances interfering in the conversation. These noises could range from background ambient noises to tapping and typing noises to noises of the traffic, overflying aircrafts etc. The unnecessary noises are affecting the concentration of the attendees, flow of the conversation and the overall effectiveness.

Existing solutions are mainly focused on hardware-based solutions, which mainly reduces the static noises caused by microphone and recording devices. There are some traditional signal processing methods like spectral filtering, noise cancellation using adaptive filtering and smoothing algorithms, which can be used to reduce the noise to some extent. All these techniques use different types of filter to reduce the noise. These filters are like static filters, which allows the kind of frequencies above or below certain limit. They cannot be configured according to the noise frequency levels of different types of noises in the audio. The noises are filtered with respect to certain threshold levels. Hence, the existing arrangement does not eliminate noise in situations where speech and noise have similar frequency levels also noises will not be reduced in overlapping noise and voice signals.

Thus, the existing systems lack capabilities such as efficient noise reduction, real-time device denoising, and enhancement of deteriorated signal in a dynamic manner thereby decrease in the efficiency of operations.

SUMMARY

Embodiments of the present disclosure provides technological improvements as solutions to one or more of the above-mentioned technical problems recognized by the inventors in conventional systems. For example, in one embodiment, a method and system for identifying a plurality of noises or their combination to suppress them and enhancing the deteriorated input signal in a dynamic manner.

In one aspect, a system is configured to identify a plurality of noises or their combination to suppress them and enhancing the deteriorated input signal in a dynamic manner. The system comprises at least one memory storing a plurality of instructions, one or more communication interfaces, and one or more hardware processors communicatively coupled with the at least one memory to execute one or more modules.

Further, the system comprises a receiving module configured to receive one or more audio signals in real-time, a noise identification module configured to identify plurality of noises in the received one or more audio signals, a pre-processing filter configured to eliminate at least spike noises from the received one or more audio signals, a format identification module configured to identify format of each of the detected noises, a format conversion module configured to convert the identified format of each noise into the pulse code modulation (PCM) format using a deep neural network, and a noise suppression module configured to suppress the one or more identified noises using the deep neural network. Herein, it would be appreciated that the deep neural network understands the behavior of the plurality of noises in the real-time.

In another aspect, a processor-implemented method to identify a plurality of noises or their combination to suppress them and enhancing the deteriorated input signal in a dynamic manner. The method comprising one or more steps as receiving one or more audio signals in real-time and identifying plurality of noises in the received one or more audio signals. The plurality of noises includes environment noises like vehicle noise, dog barking, Gaussian noises like keyboard tapping, mouse clicks, door banging, water pouring, to name a few and combination of above noises. Further comprising eliminating at least spike noises from the received one or more audio signals using a pre-processing filter, identifying format of each of the detected noises, and converting the identified format of each noise into the pulse code modulation (PCM) format using a deep neural network. Therefore, the one or more identified noises are suppressed using the deep neural network.

In yet another aspect, a non-transitory computer readable medium storing one or more instructions which when executed by a processor on a system, cause the processor to perform method. The method comprising one or more steps as receiving one or more audio signals in real-time and identifying plurality of noises in the received one or more audio signals. The plurality of noises includes environment noises like vehicle noise, dog barking, Gaussian noises like keyboard tapping, mouse clicks, door banging, water pouring, to name a few and combination of above noises. Further comprising eliminating at least spike noises from the received one or more audio signals using a pre-processing filter, identifying format of each of the detected noises, and converting the identified format of each noise into the pulse code modulation (PCM) format using a deep neural network. Therefore, the one or more identified noises are suppressed using the deep neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method to identify a plurality of noises or their combination to suppress them and enhancing the deteriorated input signal in a dynamic manner. It would be appreciated that the system is configured to suppress one or more noise in an audio input in a real-time live manner. The system detects the one or more noise in the audio input and categorizes it based on a pre-trained dataset of plurality of noises and then reduce the one or more noise by enhancing the audio input in the output. It is to be noted that the system also has a self-learning mechanism to understand and capture new noises in the environment and retrain the model so that the new noises are reduced from the next attempts.

Figure 1:
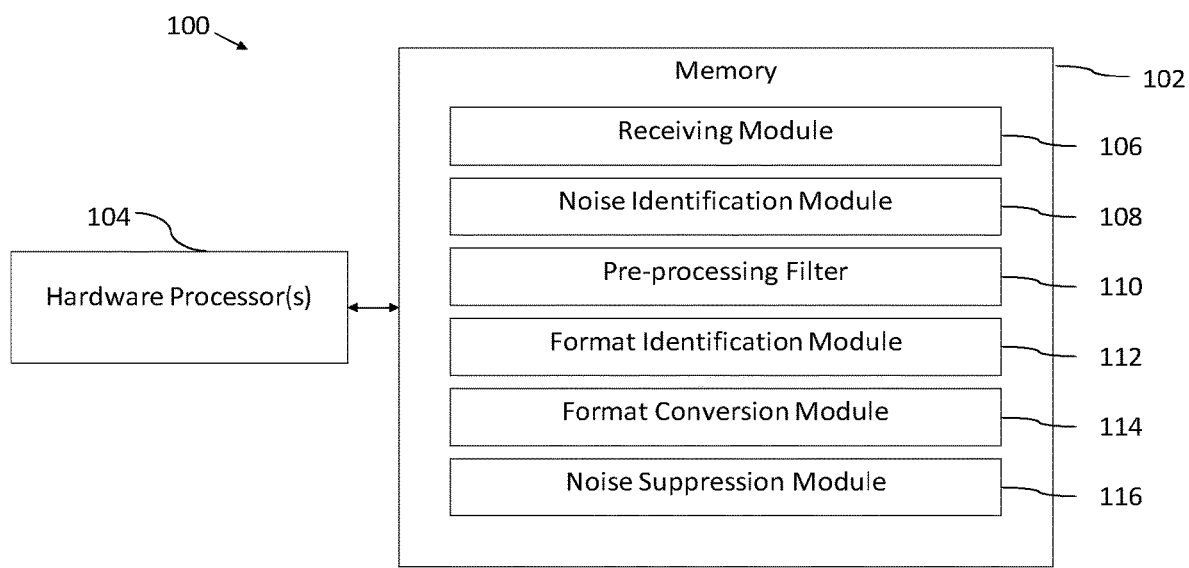
FIG. 1 illustrates a system to identify a plurality of noises and their combination to suppress them and enhancing the deteriorated input audio signal in a dynamic manner, in accordance with some embodiments of the present disclosure.
Figure 2:
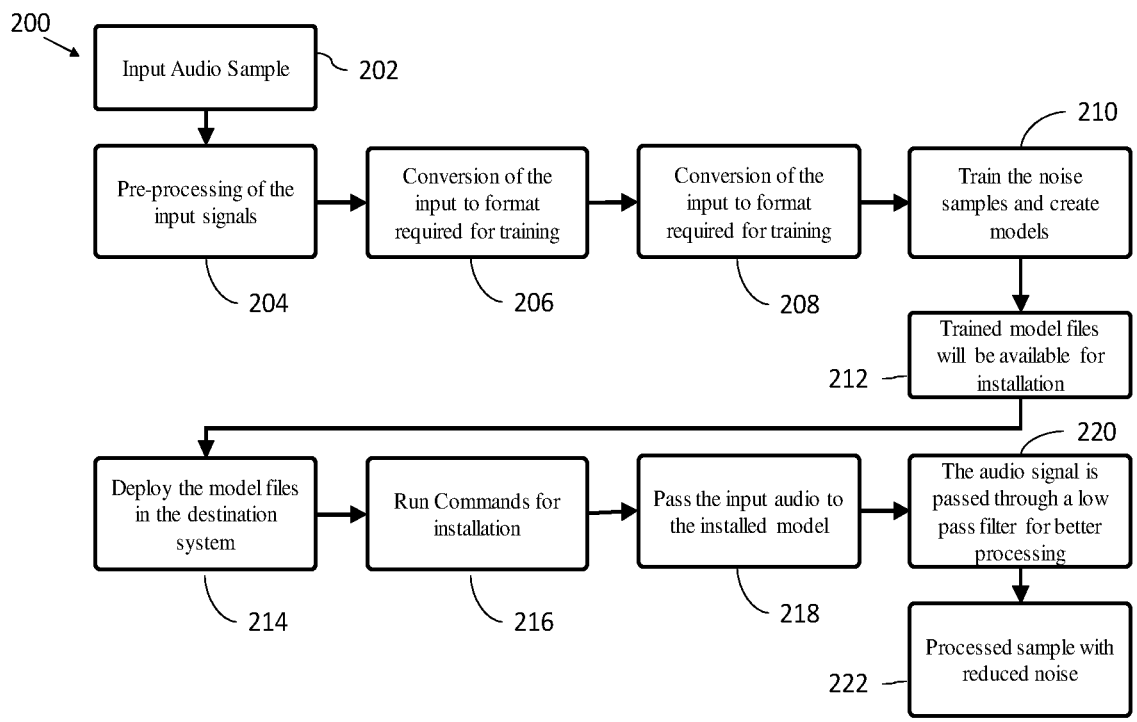
FIG. 2 is a schematic diagram to illustrate processing of input audio signal to detect and identify various noises in the signal, in accordance with some embodiments of the present disclosure.
Figure 3:
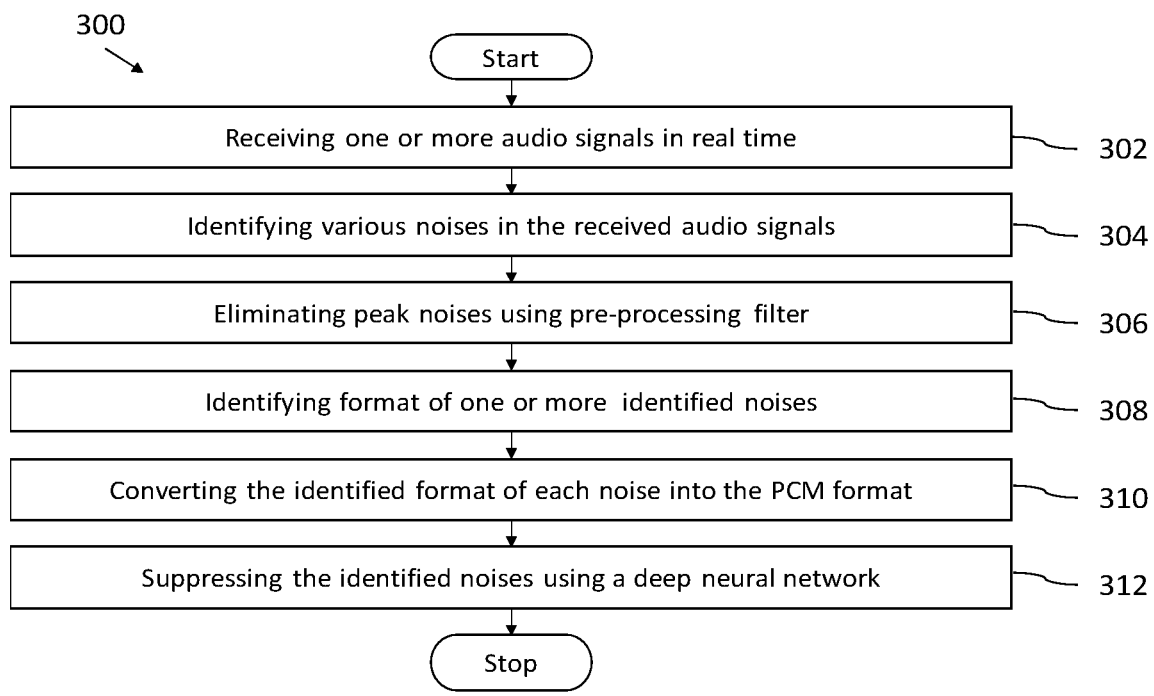
FIG. 3 is a flow diagram to illustrate a method to identify a plurality of noises or their combination to suppress them and enhancing the deteriorated input audio signal in a dynamic manner, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

In one aspect, the system (100) is configured to identify a plurality of noises or their combination to suppress them and enhancing the deteriorated input signal in a dynamic manner. It is to be noted that the plurality of noises can be considered as a disruption in the normal conversational flow. The plurality of noises are unwarranted sounds, which interfere with the voice signals. It would be appreciated that the plurality of noises can be classified based on the nature and momentary behavior of the sound signal with the time.

Referring FIG. 1, wherein the system (100) comprises at least one memory (102) with a plurality of instructions and one or more hardware processors (104) which are communicatively coupled with the at least one memory (102) to execute modules therein. Further, the system (100) comprises a receiving module (106), a noise identification module (108), a pre-processing filter (110), a format identification module (112), a format conversion module (114), and a noise suppression module (116).

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, the receiving module (106) of the system (100) is configured to receive one or more audio signals in real-time. The plurality of noises may lie near to the voice frequencies of the received one or more audio signals, which have effect on the user audio clarity. These unwanted adversary effect plays a major role in transmitting the audio information from one medium to another. The noise is a random signal so their involvement in the given conversation are unpredictable. Therefore, the intensity of the plurality of noises vary and for an individual noise, there can be many possibilities of changes or ways of producing.

It is to be noted that the plurality of noises, which are mixed with the one or more received audio signal, can be a high frequency component. These components will superimpose on the voice frequency components, which distort the signal and affect the real information that is transmitted. The conversation can happen in meeting rooms or over a conference call with people joining from some noisy places. It is to be appreciated that conversation with virtual assistant devices such as Siri, Alexa etc. is already a reality and going to have conversation with consumer access devices like refrigerators, washing machines and even cars. The plurality of noises in the audio signal could range from background ambient noises to the noise from traffic.

In the preferred embodiment of the disclosure, the noise identification module (108) of the system (100) is configured to identify plurality of noises in the received one or more audio signals. The plurality of noises includes environmental noises and Gaussian noises. The environmental noises such as vehicle noise, and dog barking and the Gaussian noises such as typing, mouse clicks, door banging, water pouring, etc. The plurality of noises are classified based on the nature and momentary behavior of the sound signal with the time.

In one example, wherein a keyboard tapping in the workplace, the noise produced can be with high volume or low, the rate of key pressed can vary and also the sound can vary based on their position with the source (Doppler Effect). A spike noise in this context is referred to the abnormality caused by undesired events. These are momentary noises, which caused by undesired events and by random unpredictable disturbances. The presence of spike noise heavily contaminates the audio signal.

In the preferred embodiment of the disclosure, the pre-processing filter (110) of the system (100) is configured to eliminate at least spike noises from the received one or more audio signals. The pre-processing filter includes a low-pass filter, a Butterworth filter, and a moving average filter.

In the preferred embodiment of the disclosure, the format identification module (112) of the system (100) is configured to identify format of each of the one or more identified noises. It would be appreciated that the one or more audio signals are sound energy waves, which are converted to electrical signals by hardware devices, which is streamed into the system or recorded using drivers in the workstation. These captured signals are encoded with one or more format such as Waveform Pulse Code Modulation Audio (.wav), Pulse Code Modulation (PCM), Moving Picture Experts Group Audio Layer 3 (mp3), and Moving Picture Experts Group Audio Layer 4 (mp4). The encryption allows the raw audio data to be compressed with optimized storage and processing capabilities.

In the preferred embodiment of the disclosure, the format conversion module (114) of the system (100) is configured to convert the identified format of each of the plurality of noises into the PCM format using a deep neural network (DNN). It would be appreciated that the DNN is trained to understand characteristic of each noise and behavior in the received audio signal.

In the preferred embodiment of the disclosure, the noise suppression module (116) of the system (100) is configured to suppress the one or more identified noises using the DNN, wherein the deep neural network understands the behavior of the plurality of noises in the real-time.

It would be appreciated that the system can process the data from the format detection module and determine the plurality of noises present in the audio signal using the DNN as illustrated in FIG. 2. Herein, the DNN is trained with one or more specified group of noises, which analyze the noise characteristics and behavior in the one or more audio signal and their random behavior pattern. The DNN is configured to detect noise, voice and a combination of both in the input and helps in suppressing noise component alone by detecting the type, category of the noise and implication of the noise in the voice frequency spectrum.

In the FIG. 2, wherein during training phase, the system is trained to detect and identify the noises and the types. These noise samples are used to train other neural network-based model to detect speech and eliminate the noise in the audio signal. The trained model can then be used for further training. While during installation, the saved model is loaded for testing the system. Finally, during testing, the chuck of audio in live stream will go through pre-processing phase i.e. low pass filter and then input is converted into the format consumed by the system and the system will detect noises in the audio signal and it will reduce the noise.

The plurality of noises is generally random in nature, which are caused by undesirable events. Thus, the form of the noise signal pattern generated cannot be determined using signal processing techniques. The DNN is trained to understand these behaviors of noises, their patterned behavior or their momentary nature with time and their spectral frequency deviations or differences. This is done by training the DNN by feeding the noise input, which can calibrate the weight matrix of neurons. Once it is trained, these weights act as various components required for noise reduction.

Further, the multiple layers of recurrent neural networks are constructed for building the architecture of the application, which allows each layer to behave as various component in noise reduction techniques like voice activity detector, which can distinguish the voice frequency components, Estimate the signal spectral values and understand the factor of spectral differences to be introduced for suppression. Therefore, when the audio signal is passed into the system or streamed, the DNN could detect and categorize the noise behavior and could estimate the spectral behavior, which allow the system to suppress the noises.

The trained noises are fed into the DNN layers, which can digest the information in the recurrent network and understand their individual patterns. These noises have individual characteristic like their momentary behavior with time, spectral values and other hidden features, which can be extracted using deep learning. This information allows the DNN to learn the noise behavior. Based on this, it can categorize into classes and when the noise is detected while streaming, it could apply dynamic suppression factor based on the learning weights. Thus, the noises in the given audio can be reduced effectively by the system.

It is to be noted that the plurality of noises can be high frequency component and these components will superimpose on the voice frequency components, which distort the signal and affect the real information that is transmitted. These noises may lie near to the voice frequencies, which have effect on the user audio clarity. These unwanted adversary effect plays a major role in transmitting the audio information from one medium to another. Reduction of noise from the input stream based on the impact of the noise on the voice across the channel. Further, the system decides the margin of reduction based on the impact of that noise.

Similarly, for a given noise in the DNN, its involvement will vary time-to-time. Thus, the DNN is trained to learn about the behavior pattern, and accordingly the DNN adjusts the weights of neuron to suppress the given noises. This exhibits the intelligent behavior of the DNN, which allows it to provide degree to which it should be reduced, based on the noise impact or involvement.

Referring FIG. 3, a processor-implemented method (300) to identify a plurality of noises or their combination to suppress them and enhancing the deteriorated input signal in a dynamic manner. The method comprises one or more steps as follows.

Initially, at the step (302), one or more audio signals are received in the real time via a receiving module (106) of the system (100). The plurality of noises may lie near to the voice frequencies of the received one or more audio signals, which have effect on the user audio clarity. These unwanted adversary effect plays a major role in transmitting the audio information from one medium to another. The noise is a random signal so their involvement in the given conversation are unpredictable. Therefore, the intensity of the noises varies and for an individual noise, there can be many possibilities of changes or ways of producing.

In the preferred embodiment of the disclosure, at the next step (304), identifying plurality of noises in the received one or more audio signals. The plurality of noises includes environmental noises and Gaussian noises. The environmental noises such as vehicle noise, and dog barking and the Gaussian noises such as typing, mouse clicks, door banging, water pouring, etc. The plurality of noises is classified based on the nature and momentary behavior of the sound signal with the time.

In the preferred embodiment of the disclosure, at the next step (306), eliminate at least spike noises from the received one or more audio signals using a pre-processing filter (110). The pre-processing filter includes a low-pass filter, a Butterworth filter, and a moving average filter.

In the preferred embodiment of the disclosure, at the next step (308), identifying format of each of the one or more identified noises at a format identification module (112) of the system (100). It would be appreciated that the one or more audio signals are encoded with one or more format such as Waveform Pulse Code Modulation Audio (.wav), Pulse Code Modulation (PCM), Moving Picture Experts Group Audio Layer 3 (mp3), and Moving Picture Experts Group Audio Layer 4 (mp4). The encryption allows the raw audio data to be compressed with optimized storage and processing capabilities.

In the preferred embodiment of the disclosure, at the next step (310), converting the identified format of each of the plurality of noises into the PCM format using a deep neural network (DNN). It would be appreciated that the DNN is trained to understand characteristic of each noise and behavior in the received audio signal.

In the preferred embodiment of the disclosure, at the last step (312), the one or more identified noises are suppressed using the DNN, wherein the DNN understands the behavior of the plurality of noises in the real-time. It is to be noted that the DNN is trained with one or more specified group of noises, which analyze the noise characteristics and behavior in the one or more audio signal and their random behavior pattern. Further, the DNN is configured to detect noise, voice and a combination of both in the input and helps in suppressing noise component alone by detecting the type, category of the noise and implication of the noise in the voice frequency spectrum.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of having uninterrupted and noise free communications without the dependency of noise removal through hardware or traditional signal processing techniques.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system comprising:
 at least one memory storing a plurality of instructions;
 one or more hardware processors communicatively coupled with the at least one memory, wherein the one or more hardware processors are configured to execute one or more modules, the at least one memory comprising:
 a receiving module configured to receive one or more audio signals in real-time;
 a noise identification module configured to identify plurality of noises in the received one or more audio signals, wherein the plurality of noises includes environmental noises and Gaussian noises;
 a pre-processing filter configured to eliminate at least spike noises from the identified plurality of noises, wherein the pre-processing filter includes a low-pass filter, a Butterworth filter, and a moving average filter;
 a format identification module configured to identify format of each of the identified noises, wherein the format of the plurality of noises include Waveform Pulse Code Modulation Audio (.wav), Pulse Code Modulation (PCM), Moving Picture Experts Group Audio Layer 3 (mp3), and Moving Picture Experts Group Audio Layer 4 (mp4);

a format conversion module configured to convert the identified format of each noise into a PCM format using a deep neural network (DNN), wherein the DNN is trained to understand characteristics of each noise comprising of spectral frequency deviations and momentary behavior with time of each of the plurality of noises in the received one or more audio signal; and a noise suppression module configured to suppress the identified plurality of noises using the DNN, and wherein the DNN applies a dynamic suppression factor based on learning weights of neurons on the one or more audio signals to suppress the identified plurality of noises.

2. The system in claim 1, wherein the plurality of noises are classified based on a nature and the momentary behavior of the one or more audio signal with the time.

3. The system in claim 1, wherein the one or more audio signals are sound energy waves which are converted to electrical signals.

4. The system in claim 1, wherein the DNN is designed to detect noise, voice and a combination of both in the input audio signal.

5. The system in claim 1, wherein the DNN is trained to reduce the noise component alone by detecting the type, category, and the implication of the noise in the voice frequency spectrum.

6. The system in claim 1, wherein the DNN is trained by feeding a noise input that calibrates a weight matrix of neurons and wherein the DNN adjusts the weights in the weight matrix to suppress the identified plurality of noises.

7. A processor-implemented method comprising:

receiving, via one or more hardware processors, one or more audio signals in real-time;

identifying, via one or more hardware processors, plurality of noises in the received one or more audio signals, wherein the plurality of noises includes environmental noises and Gaussian noises;

eliminating, via one or more hardware processors, at least spike noises from the identified plurality of noises using the pre-processing filter, wherein the pre-processing filter includes a low-pass filter, a Butterworth filter, and a moving average filter;

identifying, via one or more hardware processors, format of each of the identified plurality of noises, wherein the format of the plurality of noises include Waveform Pulse Code Modulation Audio (.wav), Pulse Code Modulation (PCM), Moving Picture Experts Group Audio Layer 3 (mp3), and Moving Picture Experts Group Audio Layer 4 (mp4);

converting, via one or more hardware processors, the identified format of each noise into the PCM format using a deep neural network (DNN), wherein the DNN is trained to understand characteristics comprising of spectral frequency deviations and momentary behavior with time of each of the plurality of noises identified in the audio signal; and suppressing, via one or more hardware processors, the one or more identified noises using the DNN, and wherein the DNN applies a dynamic suppression factor based on learning weights of neurons on the one or more audio signals to suppress the identified plurality of noises.

8. The method in claim 7, wherein the noises are classified based on the nature and momentary behavior of the one or more audio signal with the time.

9. The method in claim 7, wherein the one or more audio signal are sound energy waves which are converted to electrical signals.

10. The method in claim 7, wherein the DNN is designed to detect noise, voice and a combination of both in the input audio signal.

11. The method in claim 7, wherein the DNN is trained to reduce the noise component alone by detecting the type, category, and the implication of the noise in the voice frequency spectrum.

12. A non-transitory computer readable medium storing one or more instructions which when executed by a processor on a system, cause the processor to perform method comprising:

receiving, via one or more hardware processors, one or more audio signals in real-time;

identifying, via one or more hardware processors, plurality of noises in the received one or more audio signals, wherein the plurality of noises includes environmental noises and Gaussian noises;

eliminating, via one or more hardware processors, at least spike noises from the identified plurality of noises using the pre-processing filter, wherein the pre-processing filter includes a low-pass filter, a Butterworth filter, and a moving average filter;

identifying, via one or more hardware processors, format of each of the identified plurality of noises, wherein the format of the plurality of noises include Waveform Pulse Code Modulation Audio (.wav), Pulse Code Modulation (PCM), Moving Picture Experts Group Audio Layer 3 (mp3), and Moving Picture Experts Group Audio Layer 4 (mp4);

converting, via one or more hardware processors, the identified format of each noise into the PCM format using a deep neural network (DNN), wherein the DNN is trained to understand characteristics comprising of spectral frequency deviations and momentary behavior with time of each of the plurality of noises identified in the audio signal; and suppressing, via one or more hardware processors, the one or more identified noises using the DNN, and wherein the DNN applies a dynamic suppression factor based on learning weights of neurons on the one or more audio signals to suppress the identified plurality of noises.

\* \* \* \* \*